United States Patent
Estlick et al.

(10) Patent No.: US 7,206,916 B2
(45) Date of Patent: Apr. 17, 2007

(54) PARTIAL ADDRESS COMPARES STORED IN TRANSLATION LOOKASIDE BUFFER

(75) Inventors: Michael D. Estlick, Woburn, MA (US); Harry R. Fair, III, Arlington, MA (US); David R. Akeson, Brookline, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 317 days.

(21) Appl. No.: 10/795,815

(22) Filed: Mar. 8, 2004

(65) Prior Publication Data

US 2005/0198466 A1   Sep. 8, 2005

(51) Int. Cl.
G06F 12/10 (2006.01)

(52) U.S. Cl. ...................................................... 711/207

(58) Field of Classification Search ................ 711/205, 711/207, 210
See application file for complete search history.

(56) References Cited

U.S. PATENT DOCUMENTS

| | | | | |
|---|---|---|---|---|
| 5,109,335 A * | 4/1992 | Watanabe | ........................ | 711/3 |
| 5,440,707 A | 8/1995 | Hayes et al. | ................. | 395/403 |
| 5,440,710 A * | 8/1995 | Richter et al. | .............. | 711/207 |
| 5,497,480 A | 3/1996 | Hayes et al. | ................. | 395/493 |
| 5,586,283 A | 12/1996 | Lopez-Aguado et al. | ... | 395/417 |
| 5,671,444 A * | 9/1997 | Akkary et al. | ................. | 710/52 |
| 5,675,729 A | 10/1997 | Mehring | ................ | 395/183.13 |
| 5,754,818 A | 5/1998 | Mohamed | .................... | 395/417 |
| 5,802,568 A | 9/1998 | Csoppenszky | .............. | 711/136 |
| 5,842,225 A | 11/1998 | Kohn | ......................... | 711/202 |
| 5,899,994 A | 5/1999 | Mohamed et al. | .......... | 707/100 |
| 5,918,245 A | 6/1999 | Yung | ........................... | 711/122 |
| 5,918,251 A * | 6/1999 | Yamada et al. | .............. | 711/207 |
| 5,938,761 A | 8/1999 | Patel et al. | ................... | 712/238 |
| 6,006,312 A | 12/1999 | Kohn et al. | ................... | 711/210 |
| 6,175,898 B1 | 1/2001 | Ahmed et al. | ............... | 711/137 |
| 6,189,074 B1 * | 2/2001 | Pedneau | ....................... | 711/139 |
| 6,226,731 B1 * | 5/2001 | Dhong et al. | ................ | 711/203 |
| 6,341,357 B1 | 1/2002 | Ravichandran | ............... | 714/38 |
| 6,490,658 B1 | 12/2002 | Ahmed et al. | ............... | 711/140 |
| 6,493,812 B1 * | 12/2002 | Lyon | ........................... | 711/207 |
| 6,542,991 B1 | 4/2003 | Joy et al. | ..................... | 712/228 |
| 2003/0182512 A1 * | 9/2003 | Hammarlund et al. | ....... | 711/133 |
| 2004/0049657 A1 * | 3/2004 | Kling | .......................... | 712/208 |

OTHER PUBLICATIONS

Sun Microsystems and Fujitsu Limited, "SPARC Joint Programming Specification (JPS1): Commonality", May 2002, v1.0.4, pp. 94-96.*

* cited by examiner

*Primary Examiner*—Matthew Kim
*Assistant Examiner*—Michael Krofcheck
(74) *Attorney, Agent, or Firm*—Darby & Darby PC; John W. Branch (57) ABSTRACT

A method of performing a fast information compare within a processor which includes performing a more significant bit compare when information is loaded into a translation lookaside buffer, storing a result of the more significant bit compare within the translation lookaside buffer as part of an entry containing the information, and using the result of the more significant bit compare in conjunction with results from a compare of less significant bits of the information and less significant bits of compare information to determine whether a match is present. The more significant bit compare compares more significant bits of the information being loaded into the translation lookaside buffer with more significant bits of compare information.

21 Claims, 6 Drawing Sheets

| More Sig. Virtual Address | More Sig. Physical | Partial Compare Bits |
|---|---|---|
| | 7 | 0 |

PARTIAL ADDRESS COMPARES STORED IN TRANSLATION LOOKASIDE BUFFER

BACKGROUND OF THE INVENTION

1. Field of the Invention

The present invention relates to the field of processors and more particularly to translation lookaside buffers within processors.

2. Description of the Related Art

In computer systems it is known for a processor to have a cache memory to speed up memory access operations to main memory of the computer system. The cache memory is smaller, but faster than main memory. It is placed operationally between the processor and main memory. During the execution of a software program, the cache memory stores more frequently used instructions and data. Whenever the processor needs to access information from main memory, the processor examines the cache first before accessing main memory. A cache miss occurs if the processor cannot find instructions or data in the cache memory and is required to access the slower main memory. Thus, the cache memory reduces the average memory access time of the processor.

In known computer systems, it is common to have a process executing only in main memory ("physical memory") while a programmer or user perceives a much larger memory which is allocated on an external disk ("virtual memory"). Virtual memory allows for very effective multi-programming and relieves the user of potential constraints associated with the main memory. To address the virtual memory, many processors contain a translator to translate virtual addresses in virtual memory to physical addresses in physical memory, and a translation lookaside buffer ("TLB"), which caches recently generated virtual-physical address pairs. The TLBs allow faster access to main memory by skipping the mapping process when the translation pairs already exist. A TLB entry is like a cache entry where a tag includes portions of the virtual address and a data portion includes a physical page frame number.

One aspect of processor performance relates to monitoring certain addresses such as instruction addresses via, for example, a watchpoint address or a sample address range. When monitoring the instruction address, it becomes important to quickly compare the instruction address against the watchpoint address or the sample address range. When a match is detected between the instruction address and the monitoring address, the processor takes some sort of action such as generating a watchpoint trap if the address matches the watchpoint address or collecting sampling information if the instruction address is within the sample address range.

SUMMARY OF THE INVENTION

In accordance with the present invention, a method for performing a fast information compare within a processor is set forth in which a more significant bit compare is performed when information is being loaded into a translation lookaside buffer. The result of the more significant bit compare is stored within the translation lookaside buffer as part of an entry containing the information. When the fast compare is desired, the result of the more significant bit compare is used in conjunction with results from a compare of less significant bits of the information and less significant bits of a compare address to determine whether a match is present.

In one embodiment, the invention relates to a method of performing a fast information compare within a processor which includes performing a more significant bit compare when information is loaded into a translation lookaside buffer, storing a result of the more significant bit compare within the translation lookaside buffer as part of an entry containing the information, and using the result of the more significant bit compare in conjunction with results from a compare of less significant bits of the information and less significant bits of compare information to determine whether a match is present. The more significant bit compare compares more significant bits of the information being loaded into the translation lookaside buffer with more significant bits of compare information.

In another embodiment, the invention relates to an apparatus for performing a fast information compare within a processor which includes means for performing a more significant bit compare when information is loaded into a translation lookaside buffer, means for storing a result of the more significant bit compare within the translation lookaside buffer as part of an entry containing the information, and means for using the result of the more significant bit compare in conjunction with results from a compare of less significant bits of the information and less significant bits of compare information to determine whether a match is present. The more significant bit compare compares more significant bits of the information being loaded into the translation lookaside buffer with more significant bits of compare information;

In another embodiment, the invention relates to a processor which includes a translation lookaside buffer, a first compare unit coupled to the translation lookaside buffer and a second compare unit coupled to the translation lookaside buffer. The first compare unit performs a more significant bit compare when information is loaded into a translation lookaside buffer. The more significant bit compare compares more significant bits of the information being loaded into the translation lookaside buffer with more significant bits of compare information. The first compare unit stores a result of the more significant bit compare within the translation lookaside buffer as part of an entry containing the information. The second compare unit processor uses the result of the more significant bit compare in conjunction with results from a compare of less significant bits of the information and less significant bits of compare information to determine whether a match is present.

In another embodiment, the invention relates to a processor which includes a memory management unit and an instruction fetch unit. The memory management unit includes a memory management unit translation lookaside buffer. The instruction fetch unit includes an instruction translation lookaside buffer. The more significant bit compare is performed when information is loaded into the instruction translation lookaside buffer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
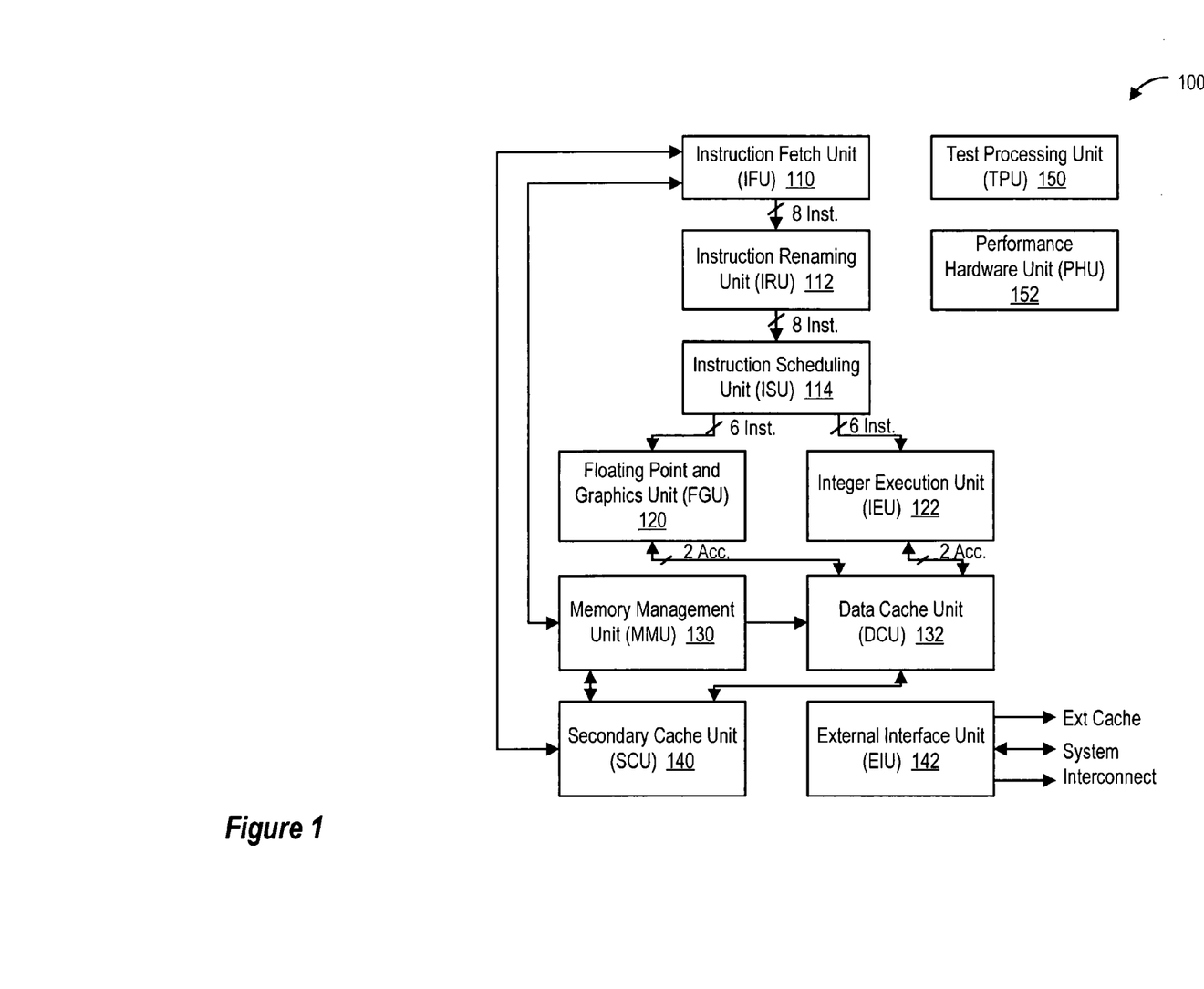
FIG. 1 shows a schematic block diagram of a processor architecture.

FIG. 1 shows a schematic block diagram of a multi-threaded processor architecture. More specifically, processor 100 includes an instruction fetch unit (IFU) 110, an instruction renaming unit (IRU) 112, an instruction scheduling unit (ISU) 114, a floating point and graphics unit (FGU) 120, an integer execution unit (IEU) 122, a memory management unit (MMU) 130, a data cache unit (DCU) 132, a secondary cache unit (SCU) 140, an external interface unit (EIU) 142. The processor also includes a test processing unit (TPU) 150 and a performance hardware unit (PHU) 152.

The instruction fetch unit 110 includes an instruction cache and branch prediction logic. The instruction fetch unit 110 is coupled to the instruction renaming unit as well as to the memory management unit 130 and the secondary cache unit 140.

The instruction renaming unit is coupled to the instruction fetch unit 110 and to the instruction scheduling unit 114. The instruction renaming unit 112 includes dependency check logic and a helper instruction generator.

The instruction scheduling unit is coupled to the floating point and graphics unit 120 and to the integer execution unit 122. The instruction scheduling unit 114 includes an instruction window module.

The floating point and graphics unit 120 is coupled to the instruction scheduling unit 114 and to the floating point and data cache unit 132. The floating point and graphics scheduling unit 120 includes floating point and graphics execution units, a floating point register file and a floating point and graphics result buffer.

The integer execution unit 122 is coupled to the instruction scheduling unit 114 and to the data cache unit 132. The integer execution unit 122 includes integer execution units, an integer register file and virtual address adders.

The memory management unit 130 is coupled to the instruction fetch unit 110 and to the secondary cache unit 140. The memory management unit 130 includes a virtual address to physical address translation module as well as a translation lookaside buffer.

The data cache unit 132 is coupled to the floating point and graphics unit 120, to the integer execution unit 122 and to the secondary cache unit 140. The data cache unit 132 includes a data cache and a memory disambiguation buffer.

The secondary cache unit 140 is coupled to the memory management unit 130, the data cache unit 132 and the external interface unit 142. The secondary cache unit 140 includes a memory scheduling window as well as a unified L2 (level 2) cache.

The external interface unit 142 is coupled to the secondary cache unit 140 as well as to an external cache and an input/output (I/O) controller. The external interface unit 142 includes a transaction scheduling window, an external cache controller and an I/O system interconnection controller.

The test processing unit 150 is coupled to various units across the processor 100. The test processing unit 150 includes a power on controller as well as a clock controller.

The performance hardware unit 152 is coupled to various units across the processor 100. The performance hardware unit includes performance instrumentation counters as well as a sampling mechanism.

The instruction fetch unit 110 is responsible for fetching instructions from the instruction cache and then sending the resulting bundles of instructions to the instruction renaming unit 112. The instruction fetch unit may fetch up to eight instructions per cycle. Each group of instructions delivered to by the instruction fetch unit is referred to as a fetch bundle. The instruction cache sources instructions to the processor pipeline by accessing a local instruction cache with predetermined cache indices. The instruction is virtually addressed by an instruction pointer generator. The branch prediction logic enables the instruction fetch unit 110 to speculatively fetch instructions beyond a control transfer instruction (CTI) even though the outcome or target of the control transfer instruction is not yet known.

The instruction renaming unit 112 decodes instructions, determines instruction dependencies and manages certain processor resources. The instruction scheduling unit 114 schedules instructions from each thread for execution, replays instructions that are consumers of loads when the load misses in the data cache, maintains completion and trap status for instructions executing within the processor 100 and separately retires instructions in fetch order from each thread.

The floating point execution unit 120 implements and executes floating point instructions and graphics instructions. The integer execution unit 122 implements and executes fixed point integer instructions. Additionally, the integer execution unit 122 assists in execution of floating point instruction which depend on integer condition codes, integer registers and floating point condition codes.

The memory management unit 130 performs virtual address to physical address translation and includes a translation lookaside buffer that provides for a translation for the most frequently accessed virtual pages.

The data cache unit 132 provides the main interface between execution pipelines and memory within the processor 100. The data cache unit 132 executes load and store instructions as well as derivatives of load and store instructions. The data cache unit 132 provides a first level cache that is coupled directly to the execution units. The memory disambiguation buffer dynamically disambiguates memory addresses to enable execution of out of order instructions.

The secondary cache unit 140 provides a unified L2 cache. The L2 cache is controlled by the memory scheduling window which tracks accesses that miss in the L1 caches, the MMU and snoop system request. The memory scheduling window provides an interface between the instruction fetch unit and the L2 cache. The memory scheduling window also receives snoops from the external interface unit 142 and retired stores from the data cache unit 132.

The external interface unit 142 controls data flow among the L2 cache and the external cache, controls system interconnect, provides external cache control and provides a common interface for external processors, I/O bridges, graphics devices, and memory controllers.

The test processing unit 150 performs power on tests as well as diagnostic access within the processor 100. The test processing unit 150 provides clock control, design for testability and access to external interfaces.

The performance hardware unit 152 uses the performance instrumentation counters to gather aggregate information about various performance events across a plurality of instructions. The sampling mechanism gathers more detailed instruction history for specific executions of a sampled instruction.

Figure 2:
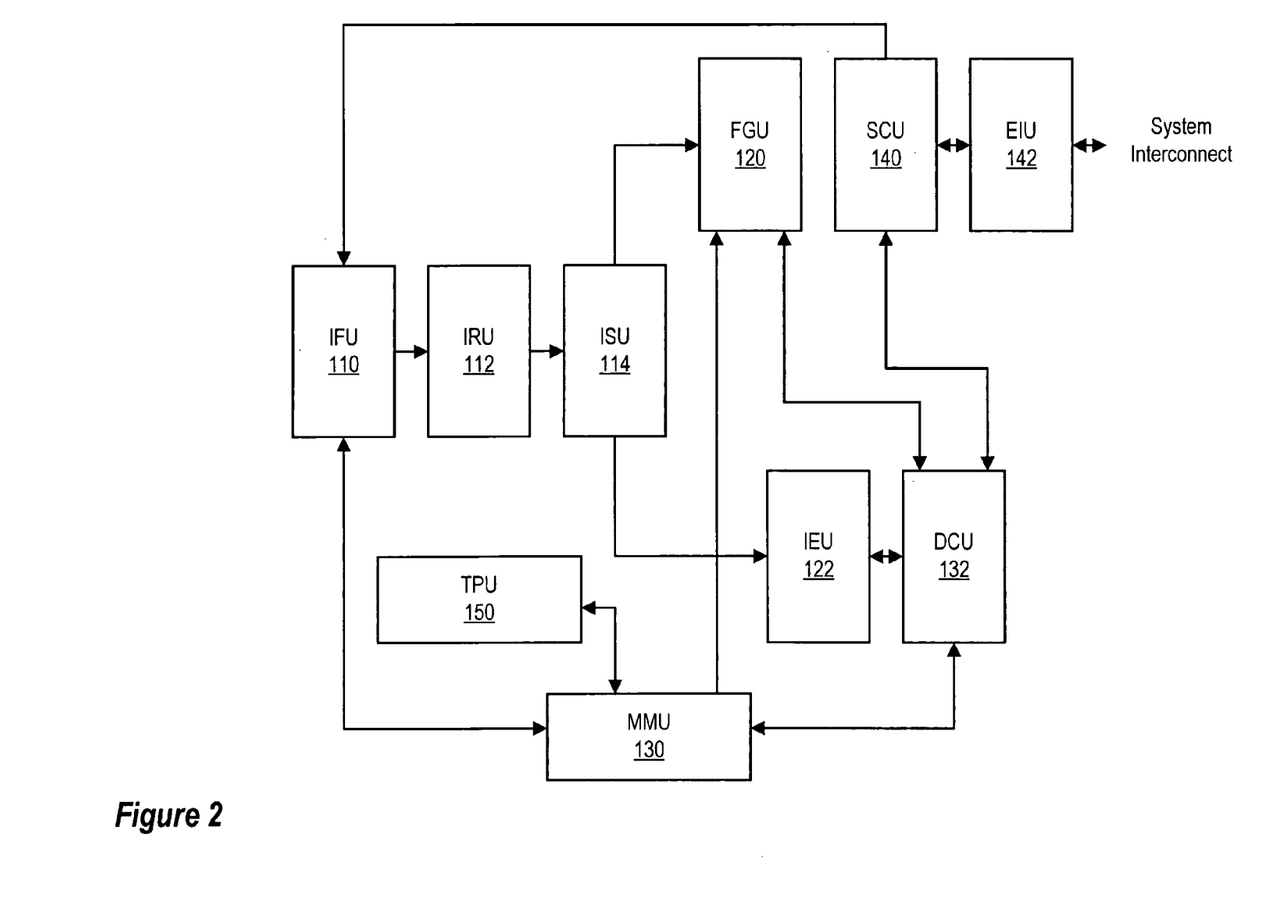
FIG. 2 shows a schematic block diagram of the interaction of a memory management unit with other portions of a processor.

Referring to FIG. 2, a schematic block diagram setting forth the interaction of a memory management unit with other portions of the processor 100 is shown. More specifically, the memory management unit 130 caches address mappings. Programs operate in a virtual address space. The memory management unit 130 translates virtual addresses that a program uses into the physical addresses of where the information actually resides. By making a distinction between the address used to reference data and the address where the data resides, an operating system may provide each program with its own address space and may enforce access permissions.

The operating system assigns each address space an identifying number (a context) and dividing the memory space into pages. Translation is performed by keeping virtual address bits which are a page offset and replacing the rest of the virtual address with a physical address. Each page has a virtual address, a physical address, and a context as well as attribute bits which determine how a program may access the page. A mapping is the association of the virtual address and context to the physical address. The memory management unit 130 provides a physical address when provided a virtual address and a context. The memory management unit 130 also enforces how the data may be accessed.

The operating system maintains a list of virtual to physical address mappings. The memory management unit 130 speeds up the translation process by storing commonly used mappings within a translation lookaside buffer (TLB). The memory management unit 130 adds new mapping when needed and evicts no longer needed mappings. When a request to the memory management unit 130 misses, indicating that the memory management unit does not have a requested mapping, the memory management unit 130 queries the operating system maintained list to serve the request.

The processor 100 includes two levels of memory mapping caching. The first level of caching is within an instruction TLB located within the instruction fetch unit 110 for instruction mappings and within a data TLB located within the data cache unit 132 for data mappings. When either the instruction TLB or the data TLB miss, then the missing TLB makes a request to the second level TLB stored within the memory management unit 130.

In one embodiment, the memory management unit includes two TLBs, a 2048 entry, 4 way set associative structure and a 32 entry content addressable memory structure. The memory management unit 130 maps a 64 bit virtual address space onto a 47 bit physical address space.

The data TLB supports access permissions for data accesses, while the memory management unit supports instruction accesses. The memory management unit supports access to a translation storage buffer, which is a direct mapped structure in memory which holds memory mappings as translation table entries. The memory management unit may either directly query the translation storage buffer via hardware or may generate a trap which allows software to query the translation storage buffer and then write the mapping into the memory management unit when an access causes the memory management unit to miss on a mapping.

Figure 3:
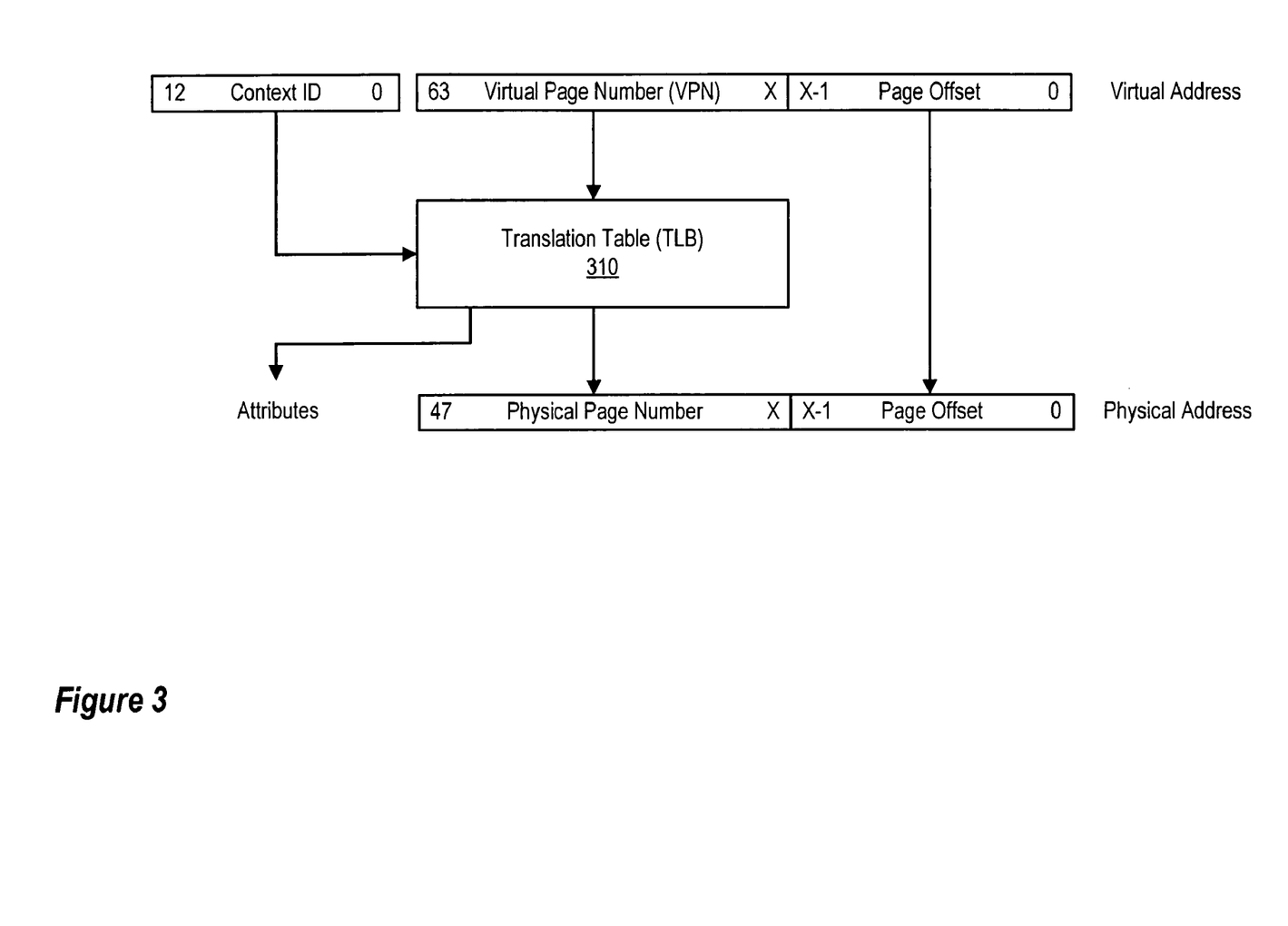
FIG. 3 shows a block diagram of a virtual address translation.

FIG. 3 shows a block diagram of a virtual address translation. The size of the virtual page number, physical page number and page offset depends on the page size. For example, for an 8K page size, X equals 13, for a 64K page size, X equals 16 and for a 512K page size, X equals 19. Other page sizes, such as 4M (Megabyte), 32 M, 256 M, 2 G (Gigabyte), and 16 G page sizes may also be used.

Figure 4:
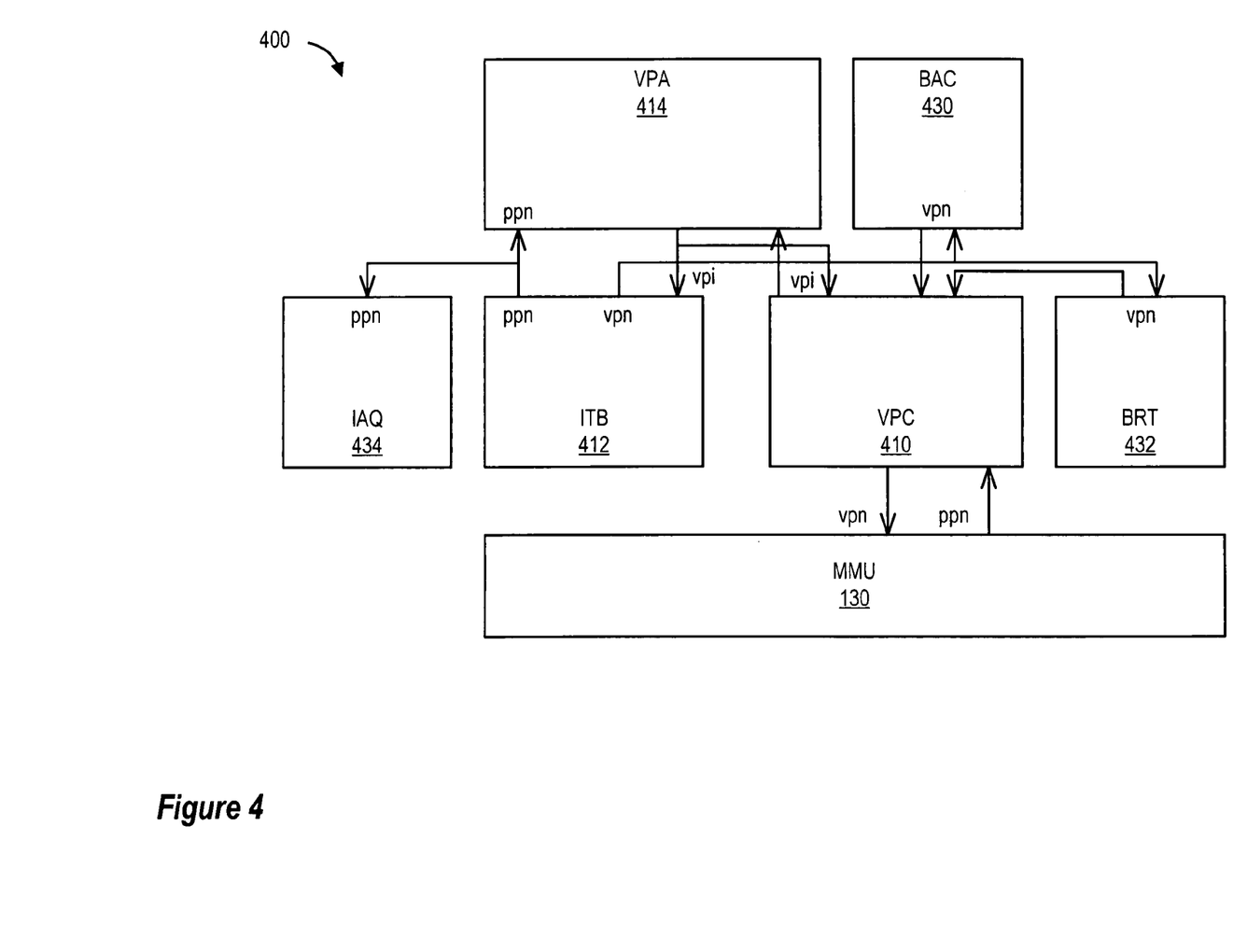
FIG. 4 shows a block diagram of a micro translation look aside buffer.

FIG. 4 shows a block diagram of an instruction micro translation lookaside buffer module 400. The instruction micro translation lookaside buffer module 400 includes a virtual page content addressable memory (CAM) (VPC) 410, an instruction translation lookaside buffer portion (ITB) 412, and a virtual page array (VPA) 414. The instruction micro translation lookaside buffer module 400 interacts with the memory management unit 130 as well as a branch address calculator (BAC) module 430, a branch repair table (BRT) 432 and an instruction address queue (IAQ) module 434, each of which are located within the instruction fetch unit 110.

The instruction micro translation look aside buffer module 400 performs first level virtual to physical address translations. The virtual page CAM 410 functions as a tag portion of the array and the instruction translation lookaside buffer portion 412 functions as a data portion of the array. The virtual page array 414 provides a direct mapped index predictor into the instruction translation lookaside buffer portion 412.

In operation, during a fast and common case of address translation, the virtual page array 414 predicts the index of the correct entry in the instruction translation lookaside buffer portion 412. The instruction translation lookaside buffer portions 412 provides an output of both a virtual page number (vpn) and a physical page number (ppn) of the translation so that the prediction can be verified.

In the case of a branch address calculator mispredict or a branch repair table redirect, the correct program count is stored within the virtual page CAM. The virtual page CAM provides a virtual page index (vpi) into the instruction translation lookaside buffer module 412. The virtual page index of the virtual page CAM 410 is also used to train the virtual page array 414. If the translation does not reside within the micro translation look aside buffer module 400, then the virtual page CAM initiates a request for a translation to the memory management unit 130.

The memory management unit 130 either provides the translation to the instruction micro translation look aside buffer 400 or generates a MMU trap to indicate that the MMU does not have the translation stored within the second level TLB. When receiving the translation from the memory management unit, the virtual page CAM 410 and the instruction translation lookaside buffer module 412 are updated.

Figure 5:
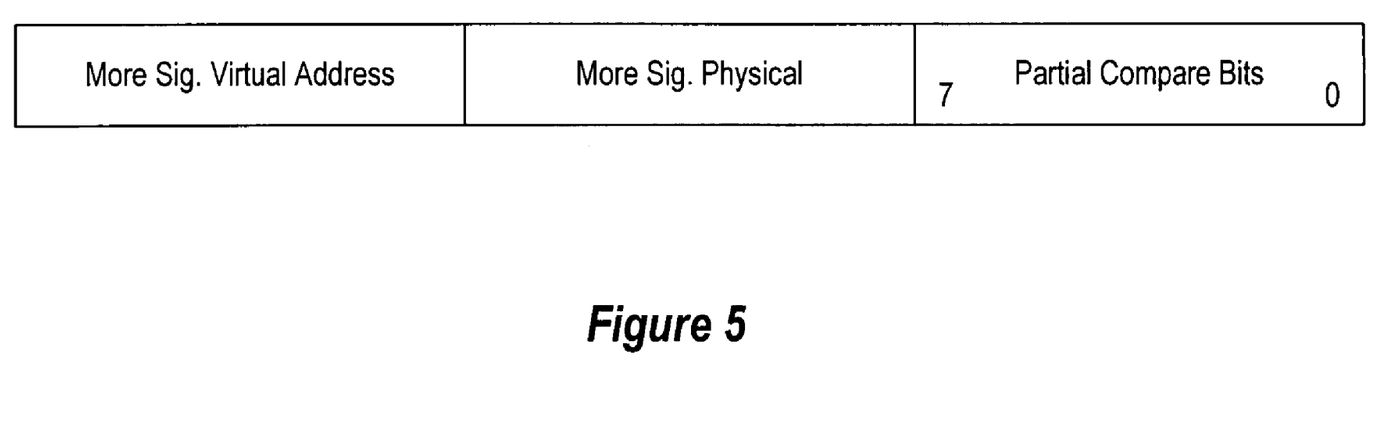
FIG. 5 shows a block diagram of a micro translation look aside buffer entry.

FIG. 5 shows a block diagram of a micro translation look aside buffer entry. More specifically, each entry of the instruction TLB includes a mapping from the upper bits of the Virtual Address to the upper bits of the Physical Address. Each entry of the instruction TLB also includes a partial address compare field for the entry. The partial address compare field includes eight bits that represent the partial compare of the upper bits of the Virtual Address to a virtual address watchpoint trap address as well as bits that represent whether the address is within a sample address range.

The eight bits include PartialCompareBit[O] through PartialCompareBit[7]. PartialCompareBit[0] represents when the entry has an address between the thread 0 sample selection criteria low address and the sample selection criteria high address. PartialCompareBit[1] represents when the entry has an address below the thread 0 sample selection criteria low address. PartialCompareBit [2] represents when the entry has an address above the thread 0 sample selection criteria high address. PartialCompareBit [3] represents when the entry has an address between the thread 1 sample selection criteria low address and the sample selection criteria high address. PartialCompareBit[4] represents when the entry has an address below the thread 1 sample selection criteria low address. PartialCompareBit [5] represents when the entry has an address above the thread 1 sample selection criteria high address. PartialCompareBit [6] represents when the entry has an address which corresponds to the thread 0 watchpoint address. PartialCompareBit [7] represents when the entry has an address which corresponds to the thread 1 watchpoint address.

Because the processor 100 includes two threads, there are bits corresponding to each of the threads. It will be appreciated that processors having other numbers of threads might have a partial address compare bits corresponding to each thread.

Figure 6:
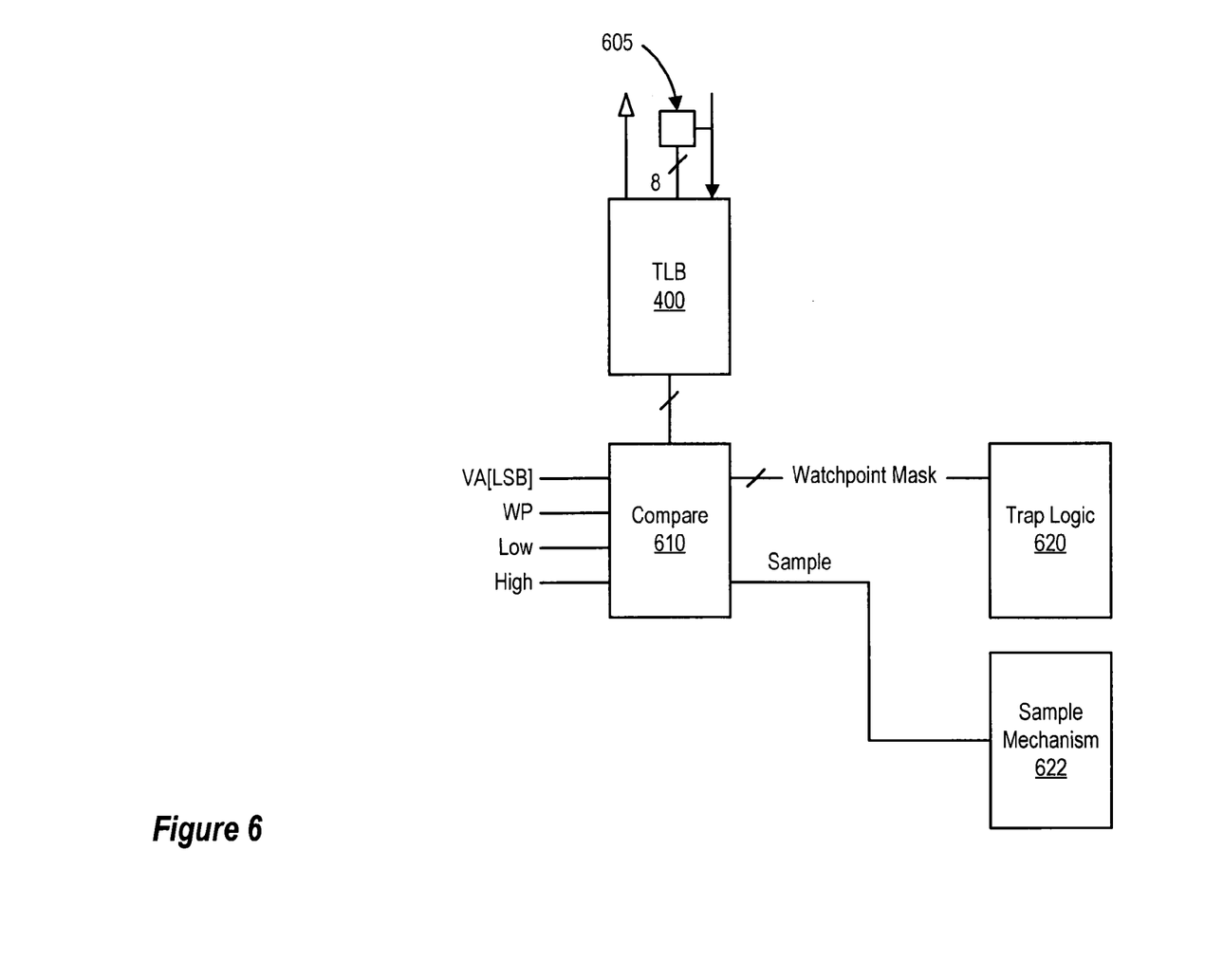
FIG. 6 shows a block diagram of the operation of portions of the processor when performing a fast address compare.

Referring to FIG. 6, a block diagram of the interaction of various processor elements is shown. More specifically, when the translation for a page is written into the instruction micro Translation Lookaside Buffer (ITLB) 400, the partial address compare field is written into the entry to support two address compares and two address range compares. The partial address compare field bits are generated based upon a comparison that is performed by compare unit 605 at the time the TLB entry is stored.

In one embodiment, the processor 100 includes two hardware threads where each thread includes an Instruction Virtual Address Watchpoint (IVAWP) and a Sampling Selection Criteria PC Range (SSC PC Range). The IVAWP is monitored via an address compare, and the SSC PC Range is monitored via an address range compare. There are three bits per address range compare and one bit per address compare.

When performing the address range compare, if the bottom of the address range is A, the top of the address range is B, and the address to compare is X, the three partial compare bits of the SSC PC Range correspond to a sample selection criteria mid address bit (A<=X<B), a sample selection criteria low address bit (X==A), and a sample selection criteria high address bit (X==B). Three bits are used to perform the address range compare from the upper bits because there are five possible cases to encode. The range is entirely inside the page, the page is entirely inside the range, the top of the range is in the page, the bottom of the range is in the page, and the page is entirely outside of the range.

When instructions are fetched during instruction execution, the ITLB 400 is accessed to obtain the virtual address to physical address mapping. The eight compare bits are also read and used to compute the final address range compares and address compares via compare unit 610. The processor 100 may fetch up to eight instructions in a bundle per cycle.

The IVAWP address compare is an exact address compare and the result is a mask that picks zero or one of the eight instructions in a bundle. The IVAWP is a debug feature that is used to cause a trap to occur on a specific instruction.

The SSC PC Range is used to constrain instruction sampling to a range of addresses. The compare is not exact and only determines if any instruction in a bundle is within the SSC PC Range. The SSC PC Range enables sampling on a bundle, and then any instruction inside that bundle might get chosen as a sample.

Because the upper bits of the compares are read from the ITLB, only the lower bits of the address need to be compared by compare unit 610 at fetch time. The work to do the address compare is split between the ITLB fill time and the fetch time. Because the time at which the ITLB is filled is not critical to the performance of the processor 100, there is more time to perform compares at ITLB fill time. Additionally, the results of the compares are cached in the ITLB 400 and can be used many times during the execution of the processor 100.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while a particular processor architecture is set forth, it will be appreciated that variations within the processor architecture are within the scope of the present invention.

Also for example, while the partial compare bits are described stored within the instruction translation lookaside buffer, it will be appreciated that the partial compare information may be stored within any translation lookaside buffer of a processor or within other temporary storage units of a processor such that the partial address compare is performed outside of any critical timing paths.

Also for example, the above-discussed embodiments include modules and units that perform certain tasks. The modules and units discussed herein may include hardware modules or software modules. The hardware modules may be implemented within custom circuitry or via some form of programmable logic device. The software modules may include script, batch, or other executable files. The modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules and units is for illustrative purposes. Alternative embodiments may merge the functionality of multiple modules or units into a single module or unit or may impose an alternate decomposition of functionality of modules or units. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method of performing a fast information compare within a processor comprising:
performing a first comparison when a first information is loaded into a translation lookaside buffer, comparing bits corresponding to a page number of the first information being loaded into the translation lookaside buffer with bits corresponding to a page number of a compare information;
storing a result of the first comparison within the translation lookaside buffer as part of an entry corresponding to the first information; and
using the stored result in conjunction with a second comparison comparing bits corresponding to a page offset of a second information and bits corresponding to a page offset of the compare information to determine whether a match is present between the second information and the compare information.

2. The method of claim 1 further comprising:
providing an indication of a match to the compare information when the stored result is active and the bits corresponding to a page offset of the second information match the bits corresponding to a page offset of the compare information.

3. The method of claim 1 wherein:
the compare information corresponds to a virtual address watchpoint.

4. The method of claim 1 wherein:
the compare information corresponds to a sample selection criteria.

5. The method of claim 4 wherein:
the sample selection criteria includes a first address and a second address corresponding to an address range; and
the result of the first comparison indicates whether the bits corresponding to a page number of the first information being loaded correspond to one of a plurality of conditions indicating whether a page corresponding to the first information is entirely inside the range, entirely outside the range, includes the entire range, includes the first address and includes the second address.

6. The method of claim 1 wherein:
the processor includes a memory management unit translation lookaside buffer and an instruction translation lookaside buffer; and
the first comparison is performed when the first information is loaded into the instruction translation lookaside buffer.

7. The method of claim 1 wherein:
the processor includes a plurality of threads; and
the compare information corresponds to one of the plurality of threads.

8. An apparatus for performing a fast information compare within a processor comprising:
means for performing a first comparison when a first information is loaded into a translation lookaside buffer, comparing bits corresponding to a page number of the first information being loaded into the translation lookaside buffer with bits corresponding to a page number of a compare information;
means for storing a result of the first comparison within the translation lookaside buffer as part of an entry corresponding to the first information; and
means for using the stored result in conjunction with a second comparison comparing bits corresponding to a page offset of a second information and bits corresponding to a page offset of the compare information to determine whether a match is present between the second information and the compare information.

9. The apparatus of claim 8 further comprising:
means for providing an indication of a match to the compare information when the stored result is active and the bits corresponding to a page offset of the second information match the bits corresponding to a page offset of the compare information.

10. The apparatus of claim 8 wherein:
the compare information corresponds to a virtual address watchpoint.

11. The apparatus of claim 8 wherein:
the compare information corresponds to a sample selection criteria.

12. The apparatus of claim 11 wherein:
the sample selection criteria includes a first address and a second address corresponding to an address range; and
the result of the first comparison indicates whether the bits corresponding to a page number of the first information being loaded correspond to one of a plurality of conditions indicating whether a page corresponding to the first information is entirely inside the range, entirely outside the range, includes the entire range, includes the first address and includes the second address.

13. The apparatus of claim 8 wherein:
the processor includes a memory management unit translation lookaside buffer and an instruction translation lookaside buffer; and
the first comparison is performed when the first information is loaded into the instruction translation lookaside buffer.

14. The apparatus of claim 8 wherein:
the processor includes a plurality of threads; and
the compare information corresponds to one of the plurality of threads.

15. A processor comprising:
a translation lookaside buffer; and
a first compare unit coupled to the translation lookaside buffer, the first compare unit performing a first comparison when a first information is loaded into a translation lookaside buffer, comparing bits corresponding to a page number of the first information being loaded into the translation lookaside buffer with bits corresponding to a page number of a compare information, the the translation lookaside buffer storing a result of the first comparison within the translation lookaside buffer as part of an entry corresponding to the first information; and
a second compare unit coupled to the translation lookaside buffer, the second compare unit using the stored result in conjunction with a second comparison comparing bits corresponding to a page offset of a second information and bits corresponding to a page offset bits of the compare information to determine whether a match is present between the second information and the compare information.

16. The processor of claim 15 wherein:
the second compare unit provides an indication of a match to the compare information when the stored result is active and the bits corresponding to a page offset of the second information match the bits corresponding to a page offset of the compare information.

17. The processor of claim 15 wherein:
the compare information corresponds to a virtual address watchpoint.

18. The processor of claim 15 wherein:

the compare information corresponds to a sample selection criteria.

19. The processor of claim 18 wherein:

the sample selection criteria includes a first address and a second address corresponding to an address range; and the result of the first comparison indicates whether the bits corresponding to a page number of the first information being loaded correspond to one of a plurality of conditions indicating whether a page corresponding to the first information is entirely inside the range, entirely outside the range, includes the entire range, includes the first address and includes the second address.

20. The processor of claim 15, further comprising:

a memory management unit, the memory management unit including a memory management unit translation lookaside buffer; and an instruction fetch unit, the instruction fetch unit including an instruction translation lookaside buffer, the first comparison being performed when the first information is loaded into the instruction translation lookaside buffer.

21. The processor of claim 15 wherein:

the processor includes a plurality of threads; and the compare information corresponds to one of the plurality of threads.

* * * * *

UNITED STATES PATENT AND TRADEMARK OFFICE
CERTIFICATE OF CORRECTION

PATENT NO. : 7,206,916 B2  Page 1 of 1
APPLICATION NO. : 10/795815
DATED : April 17, 2007
INVENTOR(S) : Estlick et al.

It is certified that error appears in the above-identified patent and that said Letters Patent is hereby corrected as shown below:

In column 2, line 31, delete "information;" and insert -- information. --, therefor.

In column 10, line 47, in Claim 15, delete "the" before "translation".

Signed and Sealed this

Twelfth Day of June, 2007

JON W. DUDAS
*Director of the United States Patent and Trademark Office*